US012365744B2

(12) United States Patent
Lee (10) Patent No.: US 12,365,744 B2
(45) Date of Patent: Jul. 22, 2025

(54) SYSTEM FOR AND METHOD OF PRODUCING PURE STARCH SLURRY AND ALCOHOL BY USING A PROCESS COMBINING WET CORN MILLING AND A DRY CORN MILLING PROCESSES (71) Applicant: Lee Tech LLC, Los Gatos, CA (US)

(72) Inventor: Chie Ying Lee, Los Gatos, CA (US)

(73) Assignee: Lee Tech LLC, Los Gatos, CA (US)

( * ) Notice: Subject to any disclaimer, the term of this patent is extended or adjusted under 35 U.S.C. 154(b) by 0 days.

(21) Appl. No.: 18/806,346

(22) Filed: Aug. 15, 2024

(65) Prior Publication Data
US 2025/0043030 A1 Feb. 6, 2025

Related U.S. Application Data (62) Division of application No. 18/211,178, filed on Jun. 16, 2023, now Pat. No. 12,065,513.

(60) Provisional application No. 63/353,480, filed on Jun. 17, 2022.

(51) Int. Cl.
*C08B 30/02* (2006.01)
*A23K 40/10* (2016.01)
*C08B 30/04* (2006.01)
*C08B 30/06* (2006.01)
*C08B 30/08* (2006.01)

(52) U.S. Cl.
CPC ............. *C08B 30/02* (2013.01); *A23K 40/10* (2016.05); *C08B 30/044* (2013.01); *C08B 30/06* (2013.01); *C08B 30/08* (2013.01)

(58) Field of Classification Search
CPC ....... C08B 30/02; C08B 30/044; C08B 30/06; C08B 30/08; A23K 40/10
USPC .......................................................... 536/45
See application file for complete search history.

(56) References Cited

U.S. PATENT DOCUMENTS

| | | | |
|---|---|---|---|
| 1,942,943 A | 1/1934 | Schnabel | |
| 2,190,176 A | 2/1940 | Smith | |
| 2,600,903 A | 6/1952 | Miller | |
| 2,967,107 A | 1/1961 | Geiger et al. | |
| 3,054,676 A | 9/1962 | Lauhoff et al. | |
| 3,058,887 A | 10/1962 | Platt et al. | |
| 3,753,723 A | 8/1973 | Henderson | |
| 3,786,078 A | 1/1974 | Smith et al. | |
| 3,827,423 A | 8/1974 | Bolitho | |
| 3,973,043 A | 8/1976 | Lynn | |
| 3,975,546 A | 8/1976 | Stahmann | |
| 4,042,172 A | 8/1977 | Norzdrovsky | |
| 4,130,553 A | 12/1978 | Batley, Jr. | |
| 4,171,383 A | 10/1979 | Chwalek et al. | |
| 4,255,518 A | 3/1981 | Muller et al. | |
| 4,313,061 A | 1/1982 | Thomas | |
| 4,333,871 A | 6/1982 | De Jong | |
| 4,341,713 A | 7/1982 | Stolp et al. | |
| 4,361,651 A | 11/1982 | Keim | |
| 4,396,161 A | 8/1983 | Roukolainen et al. | |
| 4,517,022 A | 5/1985 | Harvey | |
| 4,635,864 A | 1/1987 | Peterson et al. | |
| 4,772,481 A | 9/1988 | Rohwer | |
| 4,835,100 A | 5/1989 | Dixon | |
| 4,857,325 A | 8/1989 | Albeck | |
| 4,978,618 A | 12/1990 | Kalina | |
| 5,177,008 A | 1/1993 | Kampen | |
| 5,244,159 A | 9/1993 | Newman | |
| 5,248,099 A | 9/1993 | Lahner et al. | |
| 5,294,434 A | 3/1994 | King | |
| 5,364,335 A | 9/1994 | Franzen et al. | |
| 5,475,099 A | 12/1995 | Knauf | |
| 5,516,974 A | 5/1996 | Sasae | |
| 5,994,113 A | 11/1999 | Kauppinen et al. | |
| 6,080,401 A | 6/2000 | Reddy | |
| 6,190,462 B1 | 2/2001 | Markland et al. | |
| 6,254,914 B1 | 7/2001 | Singh et al. | |
| 6,274,358 B1 | 8/2001 | Holtz et al. | |
| 6,569,653 B1 | 5/2003 | Alard | |
| 6,899,910 B2 | 5/2005 | Johnston et al. | |
| 7,297,236 B1 | 11/2007 | Vander Griend | |
| 7,563,469 B1 | 7/2009 | Navarro et al. | |
| 7,700,094 B1 | 4/2010 | Nsereko | |
| 7,858,140 B2 | 12/2010 | Paustian et al. | |
| 7,867,648 B2 | 1/2011 | Atanasoski et al. | |
| 9,012,191 B2 | 4/2015 | Lee | |
| 9,388,475 B2 | 7/2016 | Lee | |

(Continued)

FOREIGN PATENT DOCUMENTS

AU   2013200519 B2   2/2013
CN       1966706 A   5/2007

(Continued)

OTHER PUBLICATIONS

Office Action dated Jan. 26, 2024 for Chinese Patent Application No. 202280017556.4.
Rejection Decision dated Mar. 29, 2024 for Chinese Patent Application No. 2020800701467.
Notice of Allowance dated Apr. 4, 2024 for Chinese Patent Application No. 2022800175564.
Google Search Result (Retrieved on May 22, 2024) (Year:2024).
Notification of Transmittal of International Search Report and The Written Opinion of the International Searching Authority, Or the Declaration dated Jul. 19, 2023 from PCT Patent Application No. PCT/US23/14159.

(Continued)

*Primary Examiner* — Yih-Horng Shiao
(74) *Attorney, Agent, or Firm* — Haverstock & Owens, A Law Corporation (57) ABSTRACT

System for and method of producing a pure starch slurry and alcohol by using combined corn wet and dry milling processes. A simple and lower cost process to obtain starch inside floury endosperm is provided. The starch can be highly purified to meet green technology process needs. The remaining starch inside the corn kernels can be used as feedstock for alcohol production and to produce valuable co-products such as oil and various animal feeds.

16 Claims, 9 Drawing Sheets

(56) References Cited

U.S. PATENT DOCUMENTS

| | | |
|---|---|---|
| 9,777,303 B2 | 10/2017 | Jakel et al. |
| 10,190,086 B2 | 1/2019 | Narendranath |
| 2001/0014360 A1 | 8/2001 | Paluch |
| 2002/0122944 A1 | 9/2002 | Ogle et al. |
| 2003/0180415 A1 | 9/2003 | Stiefel |
| 2004/0009160 A1 | 1/2004 | Villamar |
| 2004/0071757 A1 | 4/2004 | Rolf |
| 2004/0087808 A1 | 5/2004 | Prevost et al. |
| 2004/0187863 A1 | 9/2004 | Langhauser |
| 2004/0258782 A1 | 12/2004 | Hoffman et al. |
| 2005/0009133 A1 | 1/2005 | Johnston et al. |
| 2005/0028810 A1 | 2/2005 | Lee |
| 2005/0100996 A1 | 5/2005 | Lantero, Jr. et al. |
| 2005/0170067 A1 | 8/2005 | Shao et al. |
| 2005/0249837 A1 | 11/2005 | Massimio et al. |
| 2005/0281792 A1 | 12/2005 | Short |
| 2006/0127453 A1 | 6/2006 | Harel |
| 2006/0154353 A1 | 7/2006 | Duan |
| 2006/0292677 A1 | 12/2006 | Ostrander |
| 2007/0066476 A1 | 3/2007 | Ulmann |
| 2007/0148318 A1 | 6/2007 | Rubio et al. |
| 2007/0184159 A1 | 8/2007 | Shima et al. |
| 2007/0184541 A1 | 8/2007 | Karl et al. |
| 2007/0210007 A1 | 9/2007 | Scheimann et al. |
| 2007/0231311 A1 | 10/2007 | Kroening |
| 2008/0095881 A1 | 4/2008 | Ber |
| 2008/0210541 A1 | 9/2008 | Wenger et al. |
| 2008/0279983 A1 | 11/2008 | Lohrmann et al. |
| 2009/0029432 A1 | 1/2009 | Abbas et al. |
| 2009/0047382 A1 | 2/2009 | Cates |
| 2009/0093027 A1 | 4/2009 | Balan et al. |
| 2009/0061490 A1 | 5/2009 | Edwards et al. |
| 2009/0181153 A1 | 7/2009 | Bendorf et al. |
| 2009/0227004 A1 | 9/2009 | Dale |
| 2010/0028484 A1 | 2/2010 | Kriesler et al. |
| 2010/0082312 A1 | 4/2010 | Macharia |
| 2010/0093860 A1 | 4/2010 | Boon et al. |
| 2010/0120128 A1 | 5/2010 | Liang |
| 2010/0159547 A1 | 6/2010 | Falcounbridge |
| 2010/0159552 A1 | 6/2010 | Benson et al. |
| 2010/0196994 A1 | 8/2010 | Van Leeuwen et al. |
| 2010/0260918 A1 | 10/2010 | Wang |
| 2010/0324274 A1 | 12/2010 | DeFrees |
| 2011/0086149 A1 | 4/2011 | Bootsma |
| 2011/0100359 A1 | 5/2011 | North |
| 2011/0106277 A1 | 5/2011 | Sayyar-Rodsari |
| 2011/0123657 A1 | 5/2011 | Vandenbroucke et al. |
| 2011/0150853 A1 | 6/2011 | Mann et al. |
| 2011/0177560 A1 | 7/2011 | Galvez, III et al. |
| 2011/0223307 A1 | 9/2011 | Bertoldo de Barros et al. |
| 2011/0250310 A1 | 10/2011 | Mateus |
| 2011/0250312 A1 | 10/2011 | Lewis |
| 2011/0269185 A1 | 11/2011 | David |
| 2011/0283602 A1 | 11/2011 | Gallop et al. |
| 2011/0315541 A1 | 12/2011 | Xu |
| 2012/0048716 A1 | 3/2012 | Sonnek |
| 2012/0077232 A1 | 3/2012 | Budaraju et al. |
| 2012/0077244 A1 | 3/2012 | Budaraju et al. |
| 2012/0107454 A1 | 5/2012 | Hoffman et al. |
| 2012/0125859 A1 | 5/2012 | Collins |
| 2012/0168387 A1 | 7/2012 | Tran et al. |
| 2012/0183643 A1 | 7/2012 | Sale |
| 2012/0199531 A1 | 8/2012 | Winsness |
| 2012/0244590 A1 | 9/2012 | Lee |
| 2012/0245123 A1 | 9/2012 | Lopez Pedrosa et al. |
| 2012/0252065 A1 | 10/2012 | Rozenszain et al. |
| 2012/0270275 A1 | 10/2012 | Fenton et al. |
| 2013/0121891 A1 | 5/2013 | Dieker |
| 2013/0130343 A1 | 5/2013 | Purtle et al. |
| 2013/0224333 A1 | 8/2013 | Nanjundaswamy et al. |
| 2013/0236936 A1 | 9/2013 | Lee |
| 2013/0288376 A1 | 10/2013 | Lee |
| 2013/0206342 A1 | 11/2013 | Dahmes |
| 2013/0316041 A1 | 11/2013 | Maranz |
| 2013/0337517 A1 | 12/2013 | Razavi-Shirazi |
| 2013/0344045 A1 | 12/2013 | Faure |
| 2014/0004571 A1 | 1/2014 | Garrett |
| 2014/0053829 A1 | 2/2014 | Lee |
| 2014/0102950 A1 | 4/2014 | Bethke |
| 2014/0186868 A1 | 7/2014 | Siegert |
| 2014/0206055 A1 | 7/2014 | Ramos |
| 2014/0242251 A1 | 8/2014 | Bootsma |
| 2014/0273140 A1 | 9/2014 | Langhouser |
| 2014/0319066 A1 | 10/2014 | LoCascio |
| 2014/0343254 A1 | 11/2014 | Gerardi |
| 2015/0152372 A1 | 6/2015 | Kohl |
| 2015/0176034 A1 | 6/2015 | Ramos |
| 2015/0223493 A1 | 8/2015 | Lee |
| 2015/0231535 A1 | 8/2015 | Lee et al. |
| 2015/0240266 A1 | 8/2015 | Lee |
| 2015/0307822 A1 | 10/2015 | Rossell et al. |
| 2016/0060658 A1 | 3/2016 | Lee |
| 2016/0222135 A1* | 8/2016 | Lee .......................... C12P 7/16 |
| 2016/0374364 A1 | 12/2016 | Aurandt |
| 2017/0022529 A1 | 1/2017 | Jakel |
| 2017/0166834 A1 | 6/2017 | Jakel |
| 2017/0166835 A1 | 6/2017 | Jakel |
| 2018/0044620 A1 | 2/2018 | Bootsma |
| 2018/0225669 A1 | 8/2018 | Brotherson |
| 2018/0343891 A1 | 12/2018 | Lee |
| 2019/0017080 A1 | 1/2019 | Bootsma |
| 2019/0119711 A1 | 4/2019 | Lee |
| 2019/0211365 A1 | 7/2019 | Jakel |
| 2019/0241834 A1 | 8/2019 | Lee |
| 2021/0024964 A1 | 1/2021 | Lee |
| 2021/0059277 A1* | 3/2021 | Lee .......................... A23K 50/10 |
| 2021/0113966 A1 | 4/2021 | Benson et al. |
| 2022/0205006 A1 | 6/2022 | Cao et al. |
| 2022/0235150 A1 | 7/2022 | Lee |

FOREIGN PATENT DOCUMENTS

| | | |
|---|---|---|
| CN | 101080483 A | 11/2007 |
| CN | 101453884 A | 8/2009 |
| CN | 101621935 A | 1/2010 |
| CN | 101795578 A | 8/2010 |
| CN | 1883299 A | 6/2015 |
| CN | 104703957 A | 6/2015 |
| DE | 4239342 A1 | 5/1994 |
| EP | 0772978 B1 | 11/1991 |
| EP | 722669 B1 | 5/2002 |
| GB | 511525 A | 8/1939 |
| GB | 852995 A | 11/1960 |
| WO | 01/14595 A2 | 3/2001 |
| WO | 2006104504 A2 | 10/2006 |
| WO | 2012075481 A1 | 6/2012 |
| WO | 2012145230 A1 | 10/2012 |
| WO | 2012160191 A2 | 11/2012 |
| WO | 2012166290 A1 | 12/2012 |
| WO | 2013034747 A1 | 3/2013 |
| WO | 2014031700 A2 | 2/2014 |
| WO | 20140127852 A2 | 8/2014 |
| WO | 2016066669 A1 | 5/2015 |
| WO | 2016033548 A1 | 3/2016 |
| WO | 2016123258 A1 | 8/2016 |
| WO | 2022159719 A1 | 7/2022 |

OTHER PUBLICATIONS

Second Office Action, dated Aug. 1, 2023, from Chinese Patent Application No. 2020800701467.

International Search Report mailed Aug. 23, 2023, International Application No. PCT/US2023/018136, 20 pages.

First Office Action dated Jan. 10, 2023 from Chinese Patent Application No. 2020800731528.

Notification of Transmittal of International Search Report and The Written Opinion Of The International Searching Authority, Or The Declaration dated Oct. 11, 2023, from PCT Patent Application No. PCT/US23/25624.

Notification Concerning Transmittal of International Preliminary report on Patentability dated Sep. 12, 2024 for PCT Application No. PCT/US2023/014159.

(56) References Cited

OTHER PUBLICATIONS

International Search Report and Written Opinion from PCT Application No. PCT/US15/47577, (Mar. 3, 2016).
"Organic" organin.org; published Dec. 25, 2012, accessed on Mar. 3, 2017, available at htt://web.archive. org/web/20121225201858/ http://www.organic.org/home/faq.
Alfagreen supreme: available at:https://web.archive.org/web/ 2012120705040902/thttp://www.alphagreensupreme. comourproducts:html:published Jul. 12, 2012, accessed on Mar. 6, 2017.
Egg, whole, raw, fresh form composition of Foods Raw, Processed, Prepared, USDA National Nutrient Database for Standard Reference, Release 22, Sep. 2009; available at http://www.ars.usda.gov/ northweast-area/belysville-human-nutrition-research-center/nutrient-data-laboratory/docs/sr22-download-files/:access on Oct. 17, 2017.
Swiss chard, What's New and Benficial About Swiss Chard: The World's Healthiest Foods; availableweb. archive.org/web/ 20130117060212/http://www.whfoods.com/genpage.php?name=- foodsspice&dbib=16;published on Jan. 17, 2013; accessed on Oct. 19, 20174.
Singh et al. "Effect of Corn Oil on Thin Stillage Evaporators", Cereal Chemistry, pp. 846-849, 19999.
Blog, Birdworms & Buttermilk, Extracting Chlorophyll from Leafy Greens; available at http://birdworms.com/2010/06/26/ extractingchlorophyll from leafygreens/;accessed on Oct. 6, 2016; published on Jun. 2010.
Timbekova et al., Chenistry and Biology Activity of Triterpenoid glycosides from Medicago. In: Waller, G.R., Yamasaki, K. (eds) Saponins Used in Food and Agriculture. Advances in Experimental Medicine and Biology, vol. 405. Springer, Boston, MA. (1996).
Gonzalez-Martin, Use of NIRS technology with a remote reflectance fibre-optic probe for predicting mineral composition(Ca, K, P, Fe, Mn, Na, Zn), protein and moisture in alfala; Anal Bioanal Chem (2007) 387:2199-2205.
What Are Enzymes?: published Mar. 7, 2013; available at: https;// web.archive.org./webs/201303070025120/hrrp://www.enzyme-facts. com/enzymes.html;accessed on Aug. 11, 2017.
Notice of Rejection Decision dated May 27, 2023 from Chinese Patent Application No. 202080073152.8.
Hydrocarbon. In The Columbia Encyclopedia, by Paul Lagasse, and Columbia University. 7th ed. Columbia University Press, 2017. http://search.credoreference.com/content/entry/columency/hydrocarbon/ 0?institutionld=743.
Starch. In The American Heritage (R) Dictionary of the English Language, edited by The Editors of the American Heritage Dictionaries. 5th ed. Houghton Mifflin, 2011. http://search.credoreference. com/content/entry/hmdictenglang/starch/0?institutionld=743.
Kung, A review on silage additives and enzymes, Proceeding of the 59th Minneapolis Nutrition Conference, Sep. 1998; p. 121-135.
Heist, A Guide to Successful Yeast Propagatiion, Ethanol Producer Magazine, 2008.
Dotty 1, New natural medical antibiotic; Chlorophyll & Spinach, available at http://www.acne.org/messageboard/topic/254668-new-natural-medical-antibiotic-chlorophyllspinach/; published Nov. 30, 2009; accessed on Jul. 3, 2017.
Spinach, vol. 1, No. 14, University of the District of Columbia, Center for Nutrition, Diet and Health, published Jan. 23, 2014, accessed on Jul. 30, 2017, available at : https://web.archive.org/ web/20140123214335/https://www.udc.edu/docs/causes/online/ Spinach%2014.pdf.
Shahina Z. et al., "Variation of Protease Production by the Bacteria (*Bacillus fastidiosus*) and the Fungus (*Aspergillus funiculosus*)", Journal of Microbiology Research [online], 2013 [retrieved on Oct. 17, 2016], vol. 3, issue 4, retrieved from the Internet: <DIO: 10.5923//j.microbiology.2013030402>, pp. 135-142, see entire documents, especially p. 135.
International Search Report from PCT/US16/38436 dated Oct. 31, 2016.
International Search Report dated Dec. 18, 2018, for International Application No. PCT/US18/56340.

Office Action for Canadian Patent Application No. 2,951,715 dated Jul. 9, 2019.
Office Action for Brazilian Patent Application No. BR112015003793-3 dated Jul. 23, 2019.
Office Action dated May 9, 2019 for Canadian Patent Application No. 2,882,173.
Brazilian Office Action for Patent Application No. BR112017016172-9 Dated: 26, 2019.
Brazilian Office Action for Patent Application No. BR112017027884-7 Dated: Jan. 2, 2020.
International Preliminary Report form PCT Application No. PCT/ US2018/056340, dated Apr. 30, 2020.
Chinese Office Action dated Jun. 3, 2020 for Chinese Patent Application No. 201680007372.4.
GESE Success, Letters Educational , UK, 2006, p. 19 ( Year : 2006).
Office Action for the Argentina Patent Application No. 20160101901 Dated: Aug. 19, 2020.
Brazilian Office Action dated Aug. 8, 2020 for Brazilian Patent Application No. BR112017004017-4.
Office Action from the Canadian Patent Application No. 2,951,715 dated Aug. 28, 2020.
Labedz et al., Precise Mass Determination of Single Cell With Cantilever-Based Microbiosensor System, PLOS ONE, http//:doi. otg/10.137/journal.pone.018838, Nov. 21, 2017,pp. 1-14.
International Search Report and Written Opinion for the Application No. PCT/US20/55174 dated Mar. 18, 2021.
Xu et al., Continuous ethanol production using self-flocculating yeast in a cascade of fermentors' Enzyme and Microbial Technology 37 (2005) 634-640, entire document esp p. 635-636.
https://en.wikipedia.org/windex.php?title=Clean-in-place&oldid= 889731953'Clean-inplace' Mar. 27, 2019, entire document esp p. 2.
Best way to keep dog food and treats fresh—Vacuum seal!,vacmasterfresh.com, Aug. 26, 2015 [online], [retrieved Feb. 11, 2021]. Retrieved from the Internet<https://www.vacmasterfresh. com/fresh-bites-blog/ best-way-to-keep-dog-food-and -treats-fresh-vacuum-seal/>(Year:2015).
The Pelleting Process, California Pellet Mill Co., May 17, 2017[online], [retrieved Feb. 11, 2021]. Retrieved from the Internet<https://www. cpm.net/downloads/ Animal%20Feed%20Pelleting.pdf>(Year:2017).
Vibrating Fluid Bed Dryers, Carrier Vibrating, May 12, 2017[online], [retrieved Feb. 17, 2021].Retrieved from the Internet<https://www. carriervibrating.com/equipment/dryers/vibrating/>(2017).
Imran M. et al., Role of Enzymes in Animal Nutrition: A Review, PSM Vet. Res., 01(2)(2016): 38-45. (Year: 2016).
How many different chemical reactions ca a single enzyme catalyze?,Truong-Son N, Jan.3, 2016 [online], [retrieved Mar. 4, 2021]. Retrieved from the Internet<https://socratic.org/questions/jo-many-different-chemical-reactions-can-a single-enzyme-catalyze>(Year:2016).
International Search Report and Written Opinion for the International Application No. PCT/US2020/057558 dated Jan. 27, 2021.
Office Action for the Chinese Application No. 201680007372.4 dated Feb. 22, 2021.
Office Action for the Brazilian Patent Application No. BR 11 2015 003793-3 Feb. 2, 2021.
Office Action dated Dec. 4, 2020, for Chinese Patent Application No. 201680003607.2.
International Preliminary Report dated May 12, 2022 for the International Application No. PCT/US2020/057558.
International Search Report and Written Opinion of the International Search Authority dated Apr. 11, 2022 for International Application No. PCT/US 2022/13332, 16 pages.
International Preliminary Report on Patentability dated Apr. 21, 2022 for International Application No. PCT/US2020/055174, 9 pages.
First Office Action dated Dec. 26, 2022 from Chinese Patent Application No. 202080073152.8.
Second Office Action dated Mar. 25, 2023 from Chinese Patent Application No. 202080073152.8.
International Preliminary report on Patentability dated Dec. 26, 2024 for PCT Application No. PCT/US2023/025624.

\* cited by examiner

Fig. 6A
Cross section design for Corn move inward chamber

Fig. 6B
Cross section design for Corn move outward chamber

Fig. 6

Corn Kernel

SYSTEM FOR AND METHOD OF PRODUCING PURE STARCH SLURRY AND ALCOHOL BY USING A PROCESS COMBINING WET CORN MILLING AND A DRY CORN MILLING PROCESSES

CROSS-REFERENCE TO RELATED APPLICATION(S)

This application is a divisional patent application of the co-pending U.S. patent application Ser. No. 18/211,178, filed Jun. 16, 2023, entitled "System for and Method of Producing Pure Starch Slurry and Alcohol by Using a Process Combining Wet Corn Milling and a Dry Corn Milling Processes," which claims priority under 35 U.S.C. § 119 (e) of the U.S. Provisional Patent Application Ser. No. 63/353,480, filed Jun. 17, 2022 and titled, "System for and Method of Producing Pure Starch Slurry and Alcohol by Using a Process Combining a Wet Corn Milling and a Dry Corn Milling Processes," which are hereby incorporated by reference in its their entirety for all purposes.

FIELD OF THE INVENTION

The present invention combines dry milling and wet milling processes for producing starch, especially a pure starch slurry. The slurry can be used as a feedstock for subsequent processes requiring a high-purity starch, especially biofuel, biochemical, synthetic biology, renewal chemical and other green technology processes.

BACKGROUND OF THE INVENTION

The corn wet milling process for the last fifty years has been used to produce pure starch slurries. These are then converted to corn syrup for human consumption. This low-cost corn syrup has largely replaced cane sugar as a sweetener in processed foods. Unfortunately, over-consumption of this high fructose corn syrup can adversely affect human health. At the same time, the world population is consuming too much petroleum fuel, generating considerable carbon dioxide, and creating a global warming problem.

Many "green" technology companies have investigated using starch as a feedstock to replace fossil fuel-based hydrocarbons. Over 200 dry mill ethanol plants have been built and produce over 15.8 billion gallons of fuel ethanol in the USA per year. The dry mill process represents more than a 2000-year-old technology for converting starch in grain to alcohol and producing one low-value byproduct, dried distillers grains (DDGS) as animal feed.

The typical dry mill process also produces clean sugar solution by using a filtration method to remove all the insoluble solids (e.g., fiber and protein) from the liquefied starch solution. However, this clean sugar solution still contains all the soluble solids, such as ash from inside the corn, plus small amounts of corn oil. Many new green technology processes need higher purity starch from wet mill processes as feed stock, without oil and soluble solids from inside the corn kernels.

Figure 7:
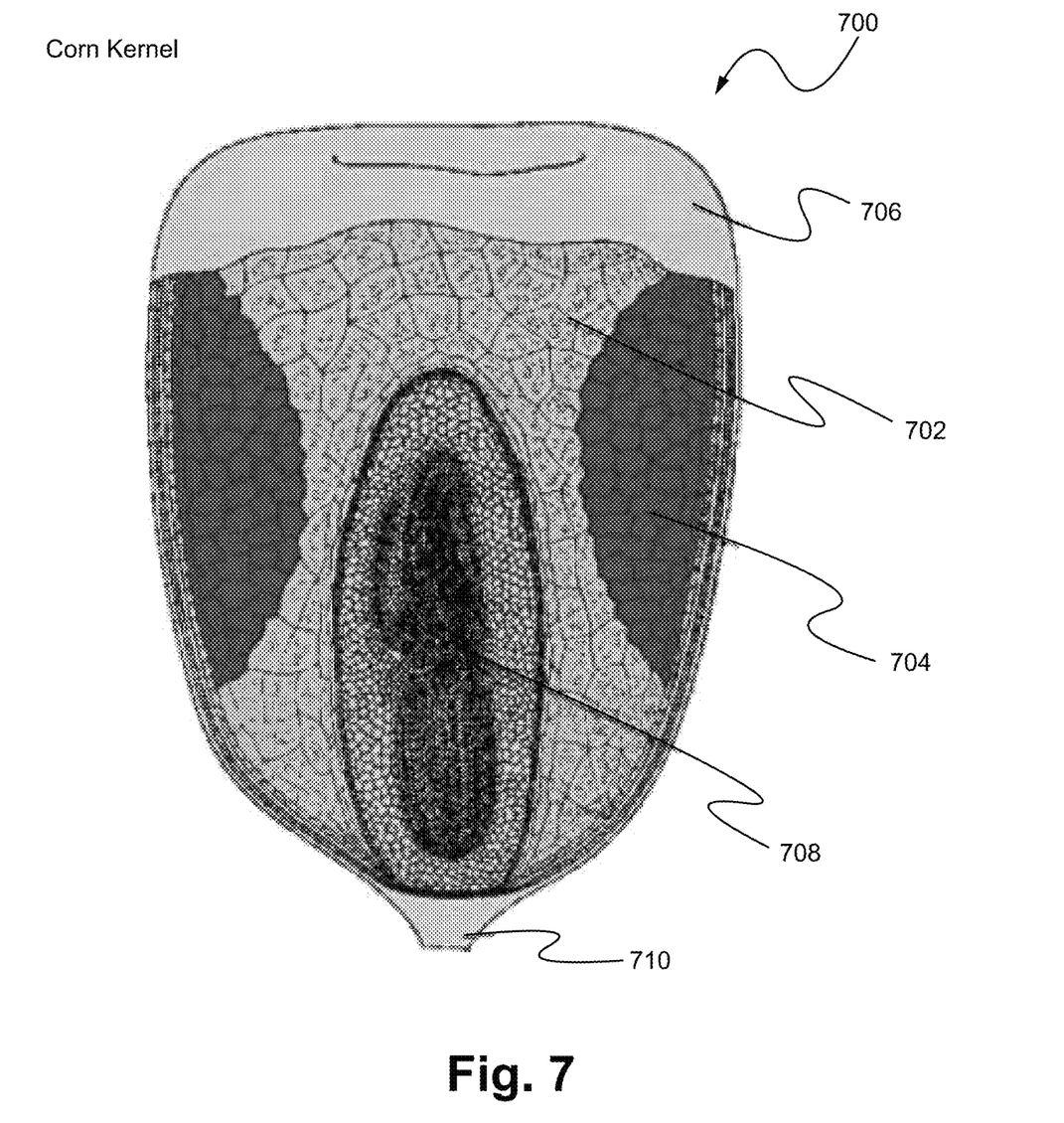
FIG. 7 illustrates the corn kernel.

A typical corn kernel is illustrated in FIG. 7. Kernel contains a hull, a floury endosperm, a horny endosperm, which have cells filled with starch granules in a protein matrix, a germ, and a tip cap. A typical corn composition is illustrated in Table 1 below.

TABLE 1

| | % On Kernel | Starch | Protein | Oil | Ash | Sugars | Fiber |
|---|---|---|---|---|---|---|---|
| Yellow Dent Corn Composition Dry basis | | | | | | | |
| Endosperm | 82.90% | 88.40% | 8% | 0.80% | 0.30% | 0.60% | 1.90% |
| Germ | 11% | 11.90% | 18.40% | 29.60% | 10.50% | 10.80% | 18.80% |
| Pericarp | 5.30% | 7.30% | 3.70% | 1% | 0.80% | 0.30% | 86.90% |
| Tip Cap | 0.80% | 5.30% | 9.10% | 3.80% | 1.60% | 1.60% | 78.60% |
| Whole kernel | 100.00% | 75% | 8.90% | 4% | 1.50% | 1.70% | 8.90% |
| wt. in Lb./Bu | 47 | 35.25 | 4.183 | 1.88 | 0.705 | 0.799 | 4.183 |
| Endosperm | 38.963 | 34.44329 | 3.11704 | 0.311704 | 0.116889 | 0.233778 | 0.740297 |
| Germ | 5.17 | 0.61523 | 0.95128 | 1.53032 | 0.54285 | 0.55836 | 0.97196 |
| Pericarp | 2.491 | 0.181843 | 0.092167 | 0.02491 | 0.019928 | 0.007473 | 2.164679 |
| Tip Cap | 0.376 | 0.019928 | 0.034216 | 0.014288 | 0.006016 | 0.006016 | 0.295536 |
| pericap + tipcap | 2.867 | 0.201771 | 0.126383 | 0.039198 | 0.025944 | 0.013489 | 2.460215 |
| % comp | 100.00% | 7.04% | 4.41% | 1.37% | 0.90% | 0.47% | 85.81% |
| change after fomenter | | −32.648 | 0.375 | | 0.4 | 2 | |
| Total by product | 15.127 | 0.602 | 4.558 | 1.88 | 1.105 | 2.799 | 4.183 |
| % Lab analysis | 100 | 3.979639 | 30.13155 | 12.42811 | 7.304819 | 18.50334 | 27.65254 |
| soluble solid | 3.904 | | | | 1.105 | 2.799 | |
| yeast | 0.83333333 | | 0.375 | | | | 0.458333 |
| germ | 3.45356 | | 0.95128 | 1.53032 | | | 0.97196 |
| corn protein | 4.169041 | | 3.11704 | 0.311704 | | | 0.740297 |
| pericap + tipcap | 2.827567 | 0.201771 | 0.126383 | 0.039198 | | | 2.460215 |
| Total | 15.1875013 | 0.201771 | 4.569703 | 1.881222 | 1.105 | 2.799 | 4.630805 |

Figure 1:
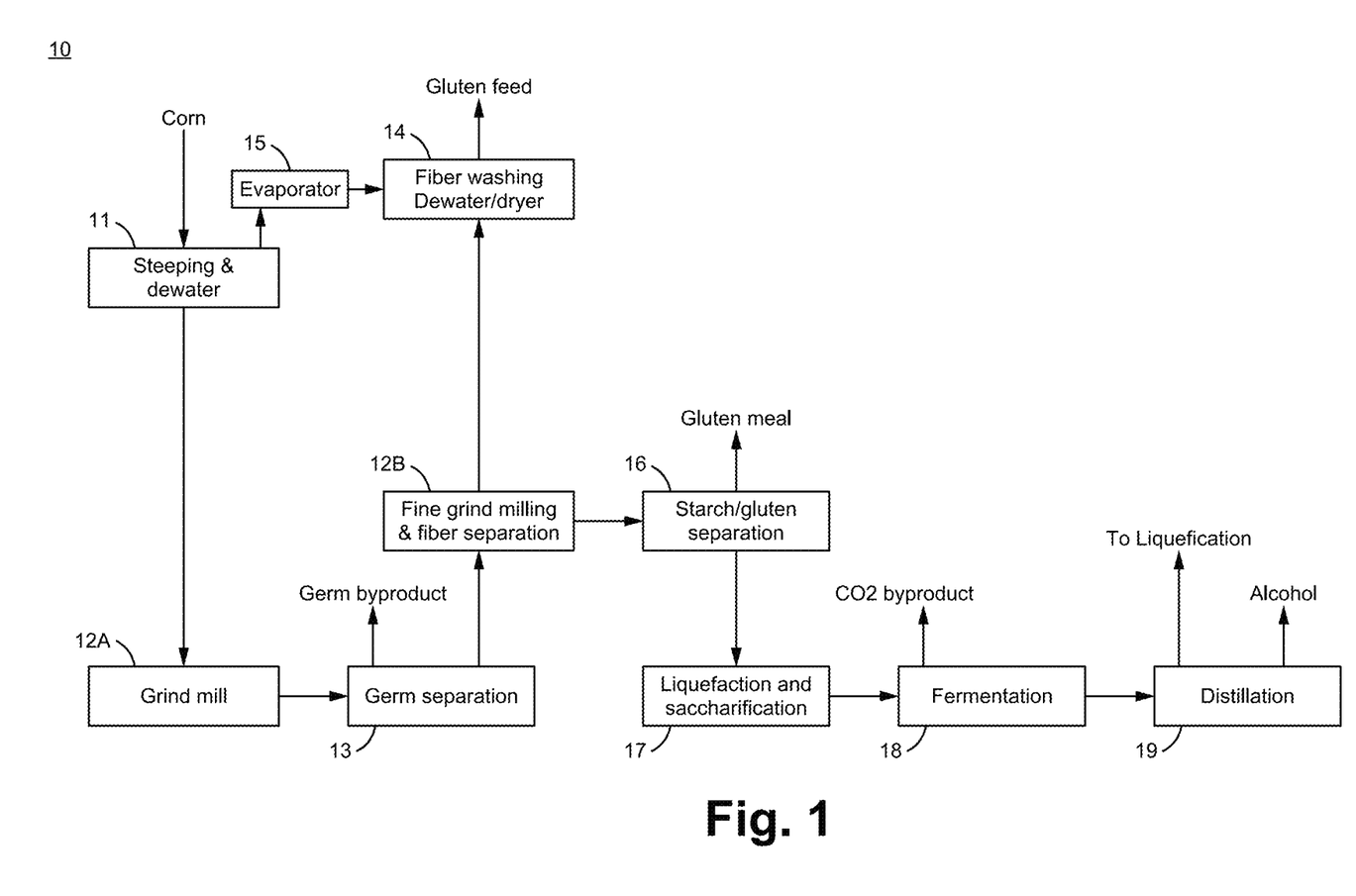
FIG. 1 illustrates a typical wet mill process.

FIG. 1 illustrates a typical corn wet milling process 10. The corn feedstock is fed through a continuous or a batch steeping at Step 11. The corn is steeped in approximately 200 PPM sulfur dioxide solution for 50 to 60 hours to soften the corn kernels. The steeping corn fully absorbs water to about 50% DS. Excess steeping liquid passes to an evaporator at Step 15.

At Step 11, the steeped corn is fed to a first milling at Step 12A to tear open the whole corn to release starch in the floury Endosperm. This forms about a 12° Baumé starch slurry (Baumé or "Be" refers to a liquid's density). This 12° Baumé starch slurry that is used as a liquid media with germ, grit and fiber particles is pumped to a first set of dual germ cyclones to separate germ from grit and fiber by using density difference in germ separation at Step 13. At Step 13, the germ particles lighter than the 12° Baumé starch slurry will come out as the light phase from the top of the first germ cyclone. This is then followed by a dewatering and washing to produce germ, as a germ byproduct, for further corn oil recovery. Still referring to Step 13, the grit and fiber particles heavier than the 12° Baumé starch slurry will come out from the bottom of the second germ cyclone, followed by a $2^{nd}$ (fine) milling and dewatering at Step 12B to break up grit (horny endosperm) to release more starch and, through a degerm process, to remove/recover germ from the steeped corn. Baumé, or Be, is a unit that is commonly used in a wet mill industry for an amount of starch in a starch slurry. One° Baumé is equal to 1.777% by weight of a starch content in starch solution/slurry. In the wet mill industry, making a 23° Baumé starch slurry is about 40% by weight, which has a purity that is able to be used as a biotech process feedstock.

Still referring to Step 13, the heavy phase from the bottom of the second germ cyclone for germ/grit separation is discharged to a liquid/solid separation at Step 12B. At Step 12B, a pressure screen is used to separate fine particles (e.g., less than 50 micron) starch and gluten from larger particles grit and fiber. Five stage counter current fiber washing system is normally used to wash starch and gluten off fiber. The fine particle stream is sent to a starch and gluten separation process at Step 16. The larger particle stream is sent to a fiber separation/washing at Step 14 to recover more starch and produce gluten feed byproducts. Typically, at least 5 countercurrent fiber washing stages are used to wash and recover starch from the fiber.

At Step 14, the washed fiber goes through a fiber pre-dewatering and then is mixed with syrup from Step 15 to be dried in a dryer and to produce fiber byproduct as a gluten feed. The gluten feed normally has a starch content as high as 20%. Because some of the starch still binds with the fine fiber and protein inside horny endosperm even though it has gone through three milling steps.

Now referring to Step 12B, the liquid and fine starch pass through a 50-micron screen containing mainly starch/gluten slurry and is sent to starch/gluten separation Step 16. Two nozzle centrifuges (primary and clarifier) in series are used in starch/gluten separation. The 12° Baumé starch slurry contains gluten from fiber separation and is fed to a primary centrifuge. The overflow from the first 10 mm starch washing cyclone is used as replacement washing in the primary centrifuge. The underflow flow from the primary centrifuge carries all the heavy solids (starch) to a starch (fiber) washing process.

At Step 16, starch/gluten separation takes place in the primary centrifuge. The overflow from the primary centrifuge contains light solid gluten. It is then fed into a gluten thickener nozzle centrifuge to produce clean overflow process water, which can be used for fiber washing degerm and steeping. The underflow from gluten thickener nozzle centrifuge is sent to a vacuum drum filter to produce gluten meal cake with about 40% DS (e.g., dry solid). The filtrate from vacuum drum filter is fed to gluten thickener nozzle centrifuge.

Still referring to Step 16, the underflow from the primary centrifuge contains some protein (soluble and insoluble) plus other soluble solids (e.g., ash inside corn). This should be removed before this starch can be used as feedstock for many green technology processes. A 12-stage counter current starch washing process with a 10 mm starch washing cyclone net is used for washing/removing soluble and insoluble proteins and soluble solids (e.g., ashes).

The primary centrifuge underflow is mixed with a $3^{rd}$ stage 10 mm cyclone feed to be sent to a $1^{st}$ stage (10 mm) cyclone. The overflow from the $1^{st}$ stage 10 mm cyclone carries all the removed soluble and insoluble proteins to the starch/gluten separation process. The $1^{st}$ set stage 10 mm cyclone underflow is mixed with a $3^{rd}$ stage 10 mm cyclone to feed the 2nd stage 10 mm cyclone. This continuous counter current washes the starch from the $1^{st}$ stage to the last stage (12) to produce pure starch as $12^{th}$ stage 10 mm cyclone underflow.

At the same time, the washing water comes in from last (12) stage and moves forward and comes out of $1^{st}$ stage 10 mm cyclone overflow, carrying all the soluble and insoluble protein.

As illustrated in the Process 10 of FIG. 1, the wet mill process is extraordinarily complex and requires an extremely high capital investment. However, it produces the maximum yield of each available product (e.g., protein, starch, and germ etc.) and gives maximum purity of all compounds inside the corn. Similar process steps are able to be used in some or all of the embodiments disclosed herein.

Referring again to the corn kernel 700 in FIG. 7, a corn kernel 700 contains hull 706, floury endosperm 702, horny endosperm 704, germ 708 and tip cap 710. Further, there are two types of starch that are inside the corn kernel 700. The starch inside the floury endosperm 702 is very loose and easy to separate out. The starch in the horny endosperm 704 is inside a protein cell wall and is not easy to be free and to be separated.

SUMMARY OF THE INVENTION

In some embodiments, the Present Disclosure provides a simpler and lower cost process to obtain the starch inside the floury endosperm and ensure the starch has a high level of purity. The remaining starch inside the corn kernel can be used as feedstock for alcohol production and produce other valuable byproducts, such as oil and various animal feeds.

Figure 2:
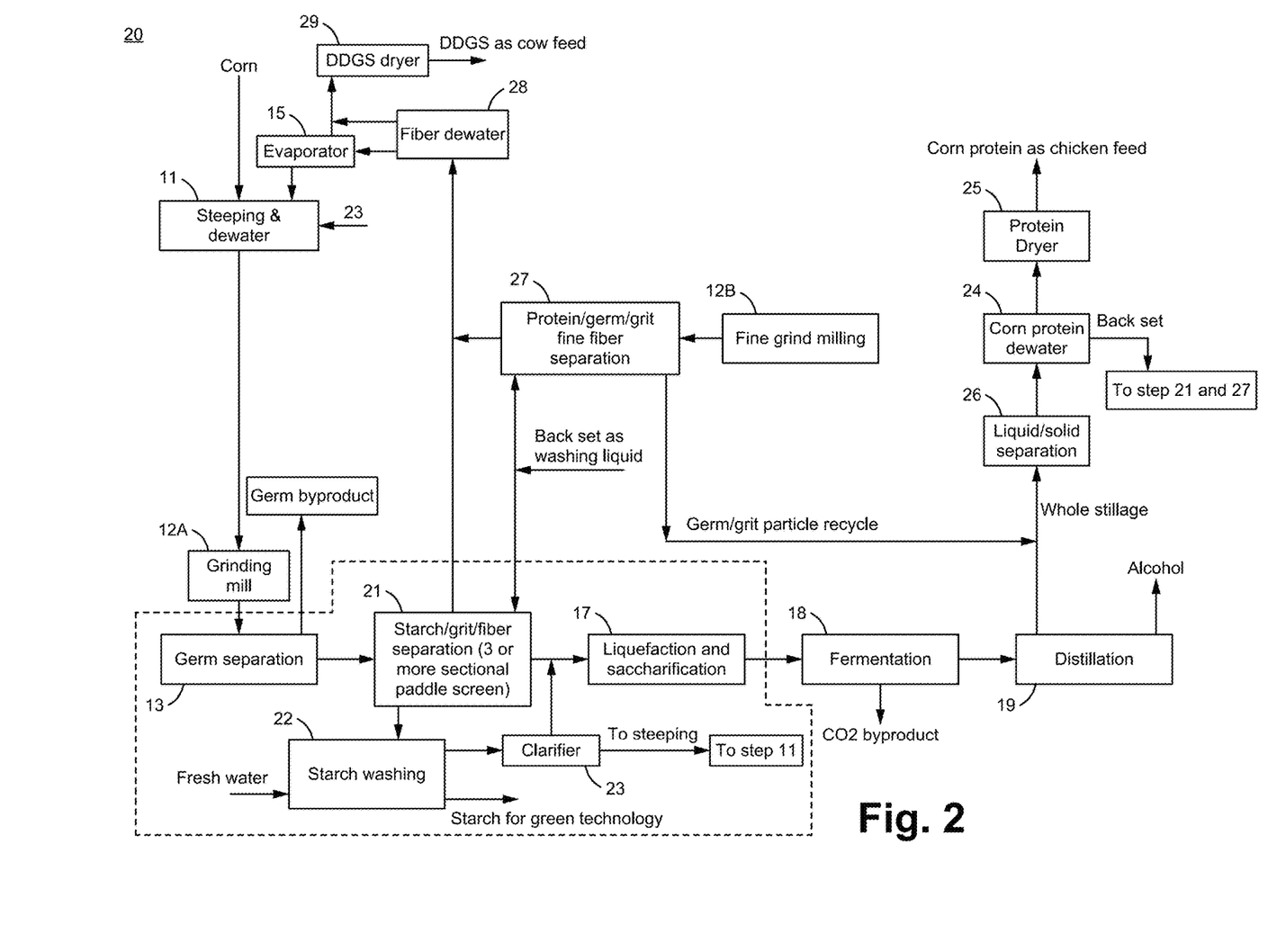
FIG. 2 illustrates an improved wet mill process with alcohol production in accordance with some embodiments.

FIG. 2 illustrates an improved wet milling process in accordance with some embodiments. Process 20 of FIG. 2 provides an improved wet mill process that produces starch which can be used as a feedstock for biotech processes, with a purity of less than 0.35% protein in the starch slurry. In some other embodiments, a feedstock for biotech processes has a purity less than 1% protein in the starch slurry. In other embodiments, a feedstock for biotech processes has a purity of protein between 1-5% in the starch slurry. In some embodiments, a feedstock for biotech processes has a purity less than 5% protein in the starch slurry.

Figure 2A:
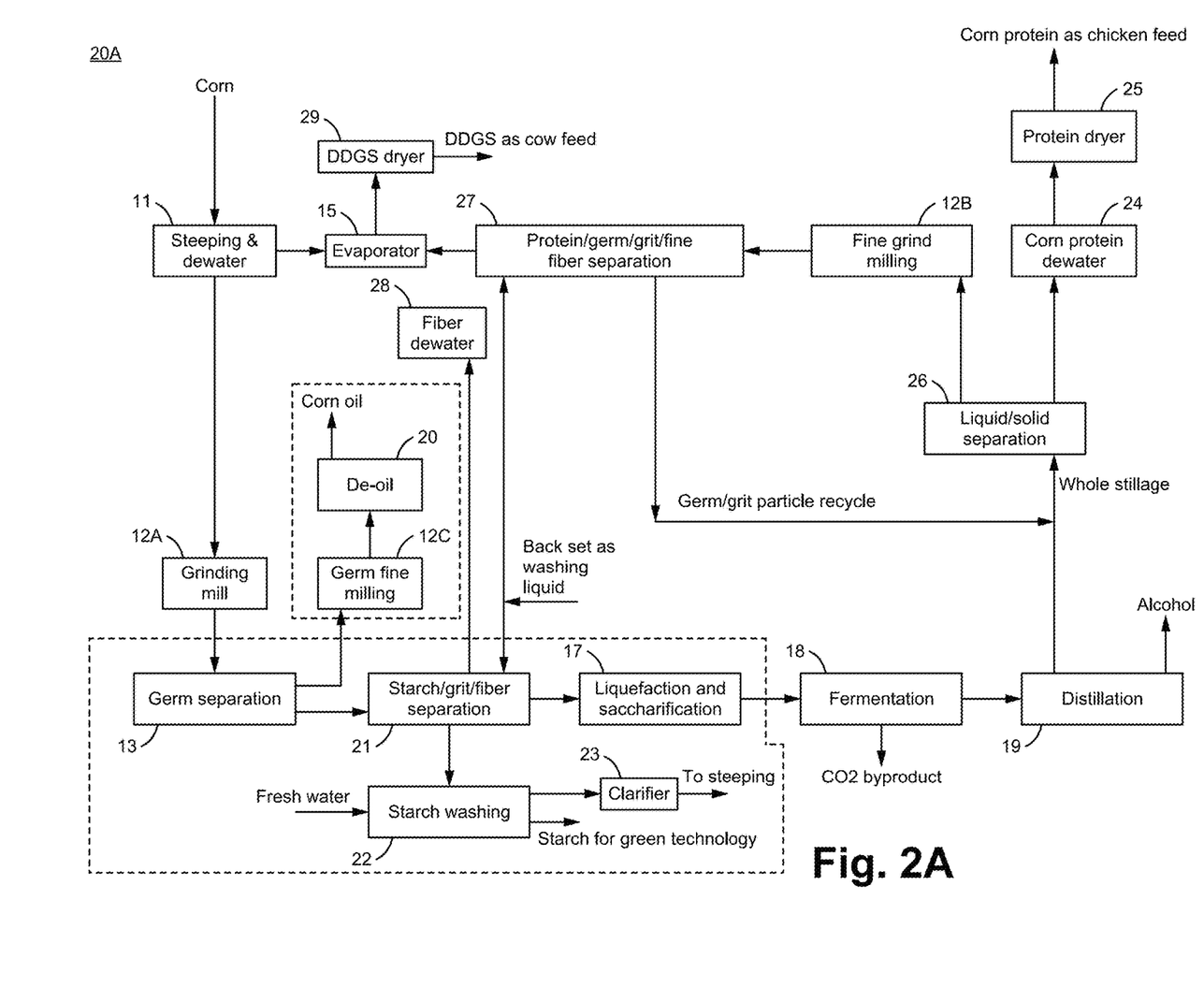
FIG. 2A illustrates another improved wet mill process with alcohol production in accordance with some embodiments.

The following is a summary of some of the embodiments. Process 20A of FIG. 2A shows a simple low cost improved wet mill plant. An improved process in accordance with some embodiments obtains the grit and fiber portion from after degerm at Step 13, which are used as feedstock to produce fuel alcohol using the residual starch inside.

Before performing Step 21, the content includes more than 10% starch. After the Step 21, the stream generated in the process disclosed herein has a high fiber content (more than 30%) as compared with the part of the corn kernels which have 70% starch and 9% fiber. The stream having a high fiber content shows that the majority portion of the starch has been removed for predetermined uses, such as serving as a feedstock for biotech processes.

Further, the fiber is removed during the liquefaction at Step 17, which is used as feedstock for fuel alcohol production. An improved wet mill combination process is shown in FIG. 2.

Initially, corn kernels are sent to steeping at Step 11, a grinding mill at Step 12A, and a degerm separation at Step 13, which can be used in typical wet mill processes. Further in FIG. 2, an improved three or more section paddle screen is used for fiber separation and washing at the Step 21 (e.g., starch/grit/fiber separation). The three or more section paddle screen is used to separate "free" starch (less than 50-micron size particles) from larger particle grit and fiber by using 50-micron screen in a paddle screen particle separator at Step 21, wherein a four-section screen separator is preferred. The "free" starch is separated as filtrate of the starch/germ/grit/fiber separation and washing at Step 21, which is followed by a 12-stage starch washing at Step 22 to produce 23° Baumé pure starch slurry with less than 0.35% protein. The cook water is used as washing water in starch washing at Step 22 to wash off protein and soluble solids. The washing liquid with protein, soluble solids and a small amount of starch is sent to a clarifier nozzle centrifuge at Step 23 to recover starch and protein.

At Step 23, the overflow from Clarifier nozzle centrifuge with soluble solid is sent to Steeping at Step 11 as steeping liquid. Still at Step 23, the underflow which contains protein and starch from the Clarifier centrifuge is sent to liquefaction and saccharification at Step 17, then is sent to fermentation at Step 18 and distillation at Step 19 to produce alcohol. At Step 19, the whole stillage, from distiller's bottom after recovering alcohol, is sent to liquid/solid separation at Step 26 (e.g., a paddle screen or any screen device can also be used) to separate any solid particles (e.g., grit and germ in this case) from liquid with small solid particles that have a size smaller than the screen size of the paddle screen. At the Step 26, the filtrate containing all liquid with solid small particles (e.g., mainly protein, germ, and yeast protein) is sent to a protein dewatering (decanter) at Step 24 to recover protein. The overflow from the decanter at Step 24 is used as washing liquid in fiber separation and washing at Steps 21 and 27. The wet cake from the decanter at Step 24, which contains mainly protein is sent to a protein dryer at Step 25 to produce high protein animal feed.

Referring back to the Step 26, the larger solid particles (e.g., grit and germ) from liquid/solid separation at Step 26 are sent to fine milling at Step 12B to be broken up further and release the starch and oil, which are protected by protein cell walls. The entire content of a fine milling device described in the U.S. Pat. No. 9,352,326 is incorporated herein by reference for all purposes. The broken-up solid particles (e.g., germ and grit) after fine milling at Step 12B are sent to another four (or more) section paddle screen at Step 27.

At the Step 27, the first section uses a 50 micron screen (in some cases, 35 to 100 micron screens can be used). The second, third and fourth sections can use 200 micron screens. In some cases, screens with 100 to 500 microns can be used. Still at Step 27, the back set stream as overflow from the decanter at Step 24 is used as a washing liquid to wash fine fiber inside germ and grit and is discharged from a solid outlet. After Step 27, a fiber dewatering at Step 28 is performed. The syrup from evaporator at Step 15 is mixed at the fiber dewatering at Step 28. The resultant from Step 28 is sent to a DDGS dryer at Step 29 to produce DDGS as cattle feed.

Still referring to Step 27, the filtrate from the second, third, and fourth section screen contains middle size germ and grit particles. These middle size germ and grit particles still have oil and starch inside, so the solid particles between the first and second screen (e.g., the particle size between 50 microns to 200 microns) can be recycled back to the solid-liquid separation at Step 26 to be re-captured and passed though fine milling at Step 12B a second time to ensure all the germ and grit have been reduced to smallest size to release starch and oil.

Figure 8:
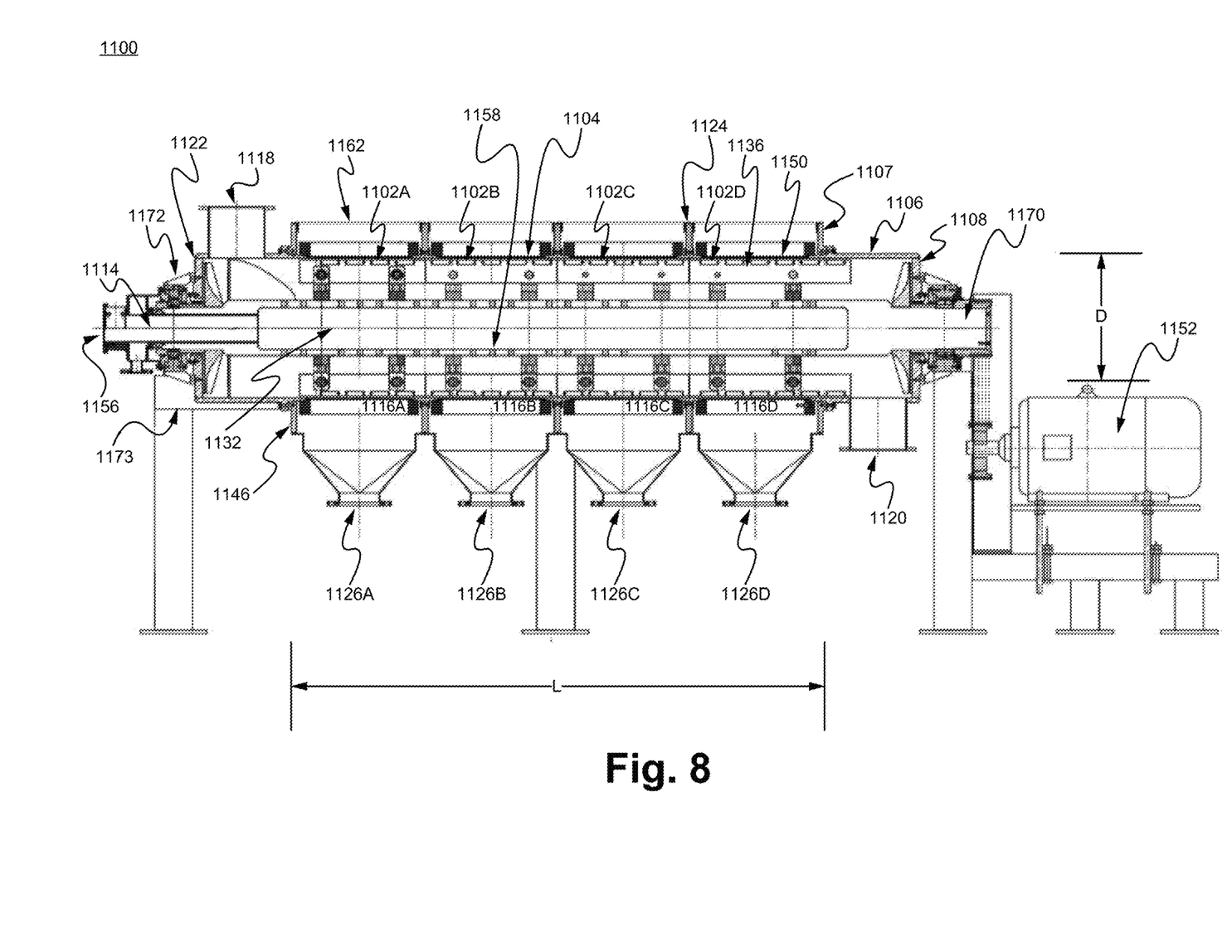
FIG. 8 contains a Drawing 1100 illustrating a cross sectional drawing of a four-section high rate displacement washing paddle screen in accordance with some embodiments.

Still referring to the Step 27, the four-section paddle screen separation and washing apparatuses as shown in Drawing 1100 of FIG. 8, which are used in the liquid/solid separation Steps 21 and 26 and washing process Step 27. The four-section paddle screen separation and washing apparatus is described in U.S. Ser. No. 63/131,035, filed Dec. 28, 2020, titled Screening Apparatus, the entire contents of which is incorporated herein by reference for all purposes.

In some embodiments, the four-section paddle screen separation apparatus (e.g., liquid/solid separation and washing at steps 26 or 27) uses a cylindrical container with an upstream inlet for a slurry and a downstream outlet for a wet cake. The walls of the container comprise four sections of screen. The first screen section can include the smallest openings such as 35 microns. The container is mounted within a housing, which is configured to collect the material passing through each of the four different screen sections. Materials that do not pass through the screen exit through the outlet. Paddles extend radially from a central axis of the container towards and just short of the inner surface of the screen. The paddles rotate and urge material against the screen. The rotating paddles also help prevent screen plugging. A conduit extends along the central axis as a source of wash water. The wash water can flow counter current with respect to the downstream direction within the container. The rake (1115 in FIG. 8 of Drawing 1100) can help move material in the downstream direction. Thus, the four or more sections can be used to separate different sizes.

Now referring to Step 13, the overflow from the dual germ cyclone separator in germ separation normally goes though many process steps (not shown) to produce corn oil, such as germ/starch separation, germ washing, germ drying, solvent oil extraction, and de-solvent. The germ protein inside the germ is denatured by the high temperature in a dryer and de-solvent equipment. The germ can be broken down to less than 50 microns by going through a grind mill at Step 12A before fermentation and fine milling at Step 12B after fermentation at Step 18 to release oil and produce oil up to 1.4 lb./Bu oil yield as described in detail in the next improved process.

Figure 3:
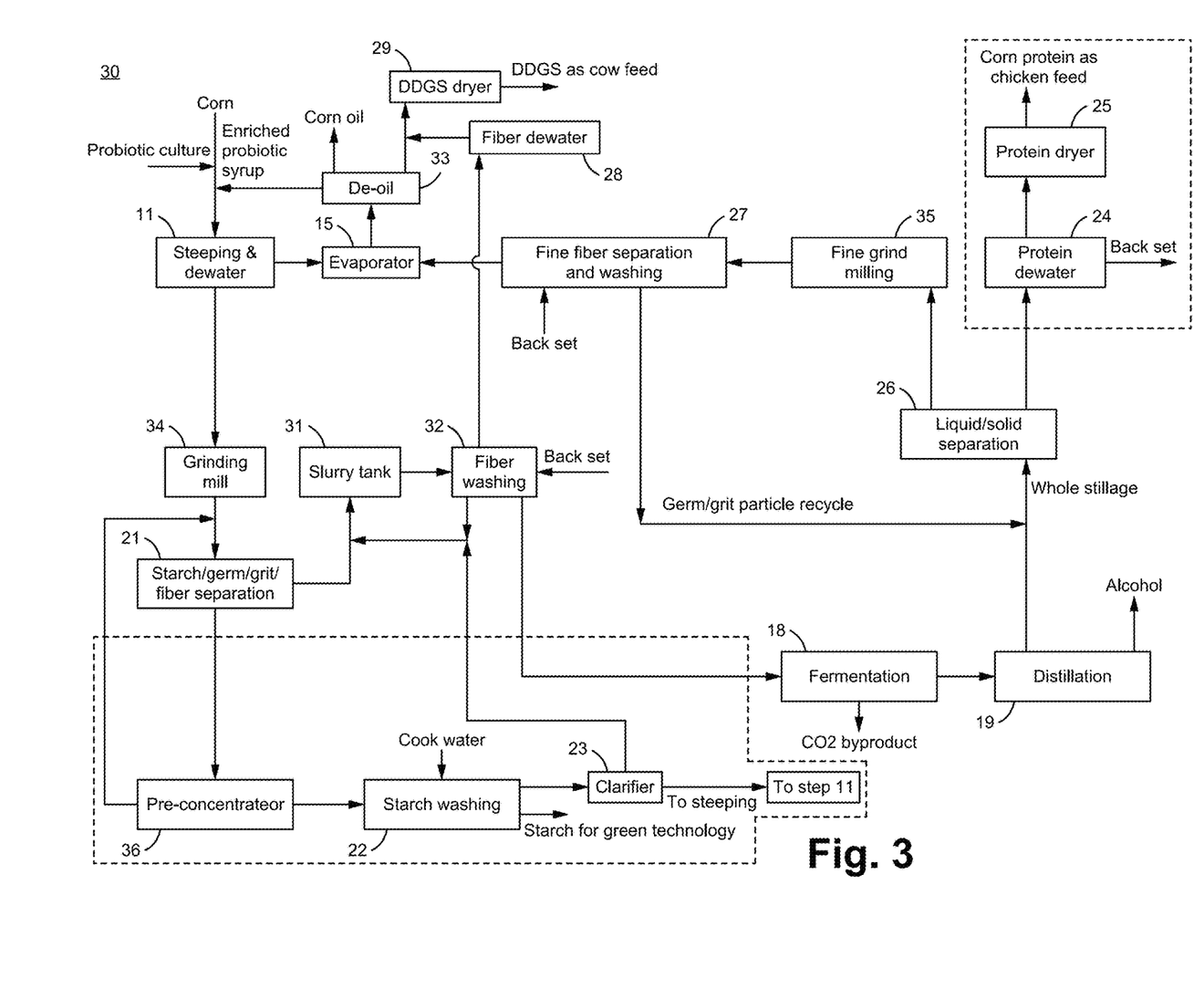
FIG. 3 illustrates an improved dry mill process with the production of the pure starch in accordance with some embodiments.

Process 30 of FIG. 3 illustrates an improved dry mill process with added pure starch production process in accordance with some embodiments. Process 30 in FIG. 3 is similar to the above Process 20 in FIG. 2 except that the germ particles are not separated. The corn is steeped with about 50% moisture after steeping, dewatered at Step 11 and sent to a grind mill at Step 34. The fine grind mill with solid ring design is described in U.S. Pat. No. 9,352,326, which is used to grind whole corn to very small particles, which is followed by starch/germ/grit/fiber separation at Step 21. The new four or more section paddle screen with very small screen size such as 35 microns are used. The filtrate containing "free" starch slurry is sent to a pre-concentrate cycle at Step 36.

At Step 36, the overflow from pre-concentrating at Step 36 recycles back to dilute the grind slurry from the grind mill at Step 34. The underflow from the pre-concentrating at Step 36 is sent to a 12-stage counter starch washing system at Step 22. The cook water as fresh washing water is fed to the last stage of a 10 mm cyclone net to wash off protein and soluble solids and to produce 23° Baumé pure starch slurry with less than 0.35% protein using the underflow of the last stage of a 10 mm cyclone net. At Step 23, the washed off protein stream with a small amount of starch is sent to a clarifier nozzle centrifuge. At Step 23, the overflow from the clarifier with soluble solids is sent to a steeping tank at Step 11 to serve as the steeping liquid for steeping the corn kernels.

At Step 31, the underflow from the clarifier at Step 23 (which contains starch and protein) is mixed with wet cake (mainly germ, grits, and fiber) from Step 32 and is sent to a slurry tank at Step 31 to cook and liquefy the "bound" starch and release some of the corn oil inside the germ.

The liquefied starch slurry from the slurry tank at Step 31 is sent to a fiber separation/washing at Step 32 to separate and wash larger size fiber (e.g., pericarp and tip cap). The slurry comes out as a wet cake, which is then sent to a dewatering at Step 28. Next, the fibers are mixed with the de-oil syrup from de-oiling at Step 33 to go to a DDGS dryer at Step 29 to produce enriched (e.g., high lactic acid) DDGS as cattle feed. The selection of the three or four section high-rate displacement washing paddle screen with a screen size from 100 microns to 1 mm depends on the fiber purity and yield and front oil yield that are needed.

At Step 32, a portion of the back set stream is used as washing liquid to wash off liquefied starch, protein, and oil. Still at Step 32, the filtrate (which contains mainly liquefied starch and some small germ particles from fiber washing at Step 32) is sent to fermentation at Step 18 to produce alcohol, which is followed by distillation at Step 19 to recover alcohol and whole stillage for byproducts production.

The whole stillage from distillation at Step 19 is sent to a solid-liquid separation at Step 26 to separate grits and germ, which then is sent at Step 35 to a fine grind mill with solid ring design, as described in U.S. Pat. No. 9,352,326, to break up all germ and grit particles to as small as possible (e.g., less than 50 microns) to release bound starch and oil. The paddle screen (four sections with high-rate displacement washing) at Step 27 is used to separate/wash fine fiber which is discharged as a wet cake and followed by fiber dewatering at Step 28. The fiber from Step 28 is mixed with syrup from Step 33 to be dried in the DDGS dryer at Step 29 to produce DDGS as cattle feed.

Referring to Step 26, the filtrate from solid/liquid separation at Step 26 contains mainly high-value protein (corn protein, germ protein, and yeast protein). These are sent to a protein dewatering decanter at Step 24 to recover the proteins (mainly corn protein with some germ protein and small amount of yeast protein). After Step 24, a protein dryer is used at Step 25 to produce gluten meal with 60% protein as chicken feed. The yeast protein and some corn oil can be harder to recover in Process 30 in FIG. 3 when a typical whole stillage decanter is used. The following Process 40 of FIG. 4 has an added oil/protein separation nozzle centrifuge.

Figure 4:
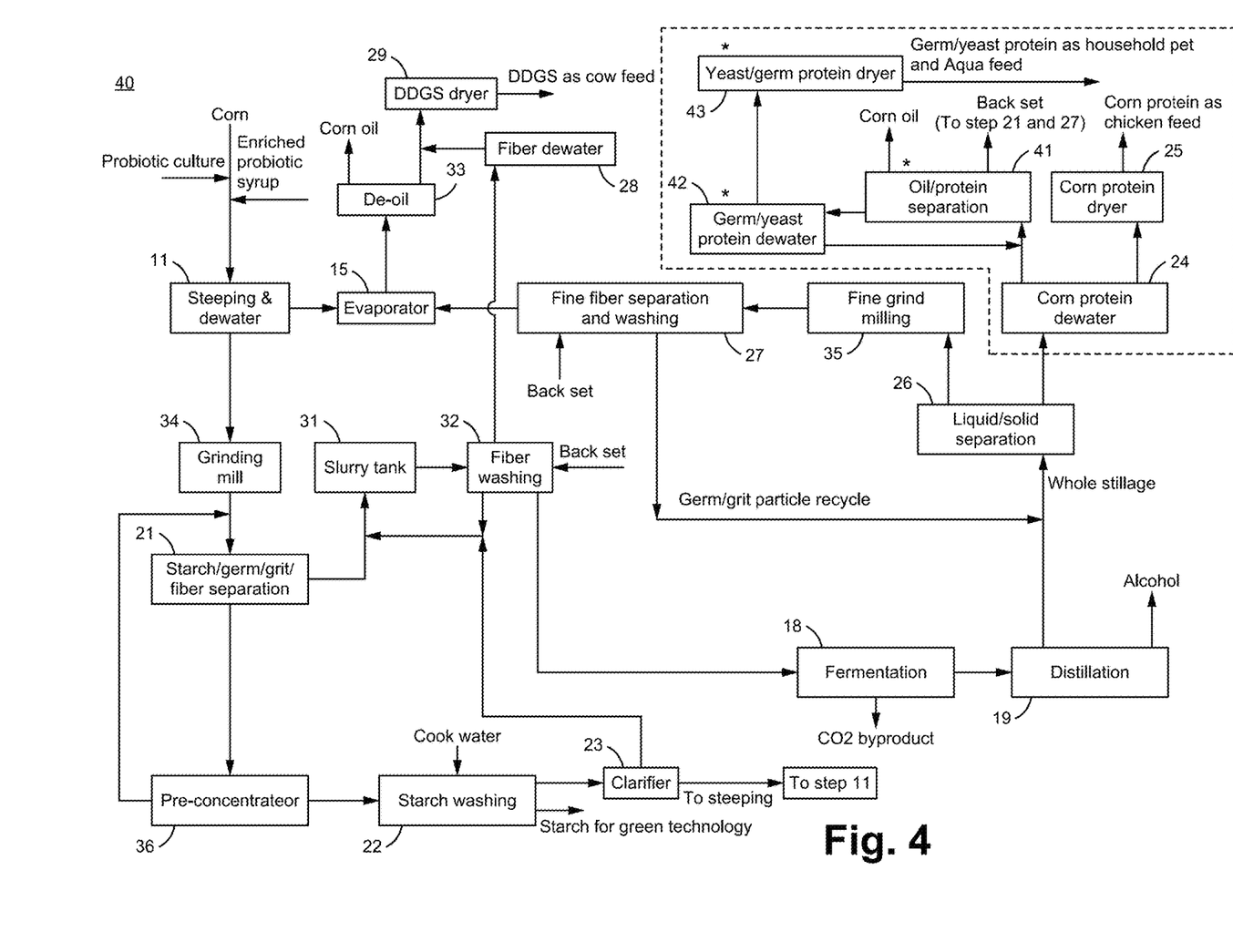
FIG. 4 illustrates a process for producing pure starch and alcohol plus high value byproducts in accordance with some embodiments.

Process 40 of FIG. 4 illustrates a pure starch production and alcohol production with the production of high value byproducts in accordance with some embodiments. This process is similar to Process 30 in FIG. 3 described above with the addition of oil/protein separation at Step 41, yeast/germ protein dewatering at Step 42 to produce high value yeast/germ protein meal, and yeast/germ protein drying at Step 43 to produce high value yeast/germ protein for pet and aqua feed.

At Step 24, the overflow from corn protein dewater at Step 24 is used as a back set in the Process 30 in FIG. 3, which are sent to oil/protein separation at Step 41 (e.g., using a high-speed nozzle centrifuge) to break the oil/protein emulsion and to separate/recover oil as a light phase from three phase nozzle centrifuge. At Step 41, the heavy phase from a nozzle centrifuge is used as a backset as washing liquid for the fiber washing at Steps 21 and 27. The under flow from nozzle centrifuge at Step 41 is sent to a protein dewatering at Step 42 to produce protein wet cake, which is followed by protein dryer at Step 43 to produce yeast/germ protein meal for household pet and aqua feed.

Figure 5:
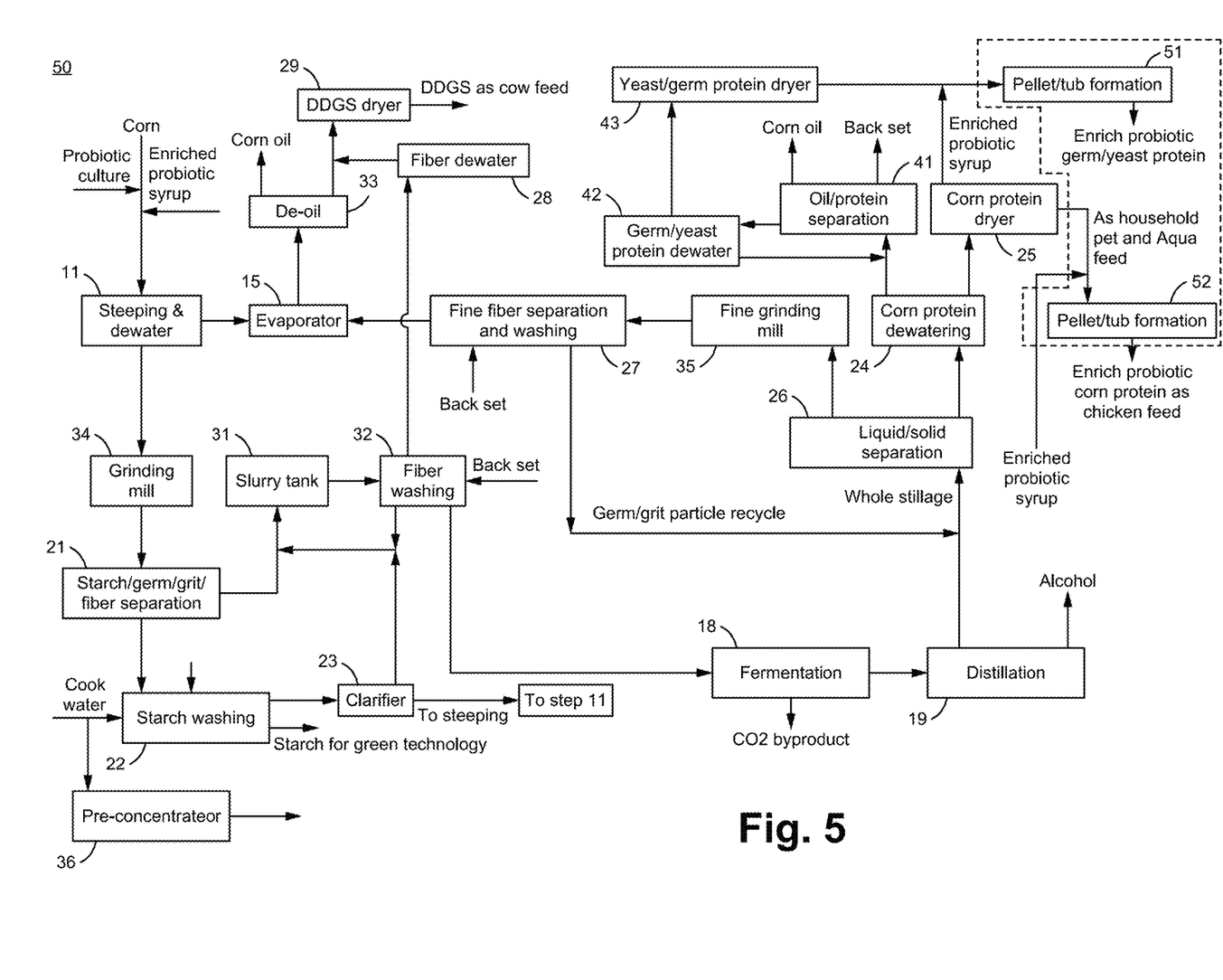
FIG. 5 illustrates a process for producing pure starch and alcohol plus maximum byproducts value with minimum capital cost operation cost and low energy input in accordance with some embodiments.

A process 50 of FIG. 5 illustrates a pure starch production for green technology and alcohol production with maximum byproduct value with minimum capital and operation cost and energy input in accordance with some embodiments. At Step 11, the lactic acid probiotic culture, such as *Lactobacillus plantarum* ZJ316, Lactobacillus amylovorus, Lactobacillus fermentum, and Lactobacillus mucosae are added to steeping and dewater at Step 11 to propagate CSU probiotic units and to produce lactic acid up to 5% DB lactic acid in the steeped liquid. This enriched probiotic steeped liquid or its concentrate syrup after evaporate at Step 15 can be used as a part of animal drinking water formula or baby animal milk formula. This enriched probiotic syrup can be used as a bonding agent to form an enriched probiotic pellet/tub animal feed in steps 51 and 52 for household pet, aqua feed and chicken feed.

Figure 6:
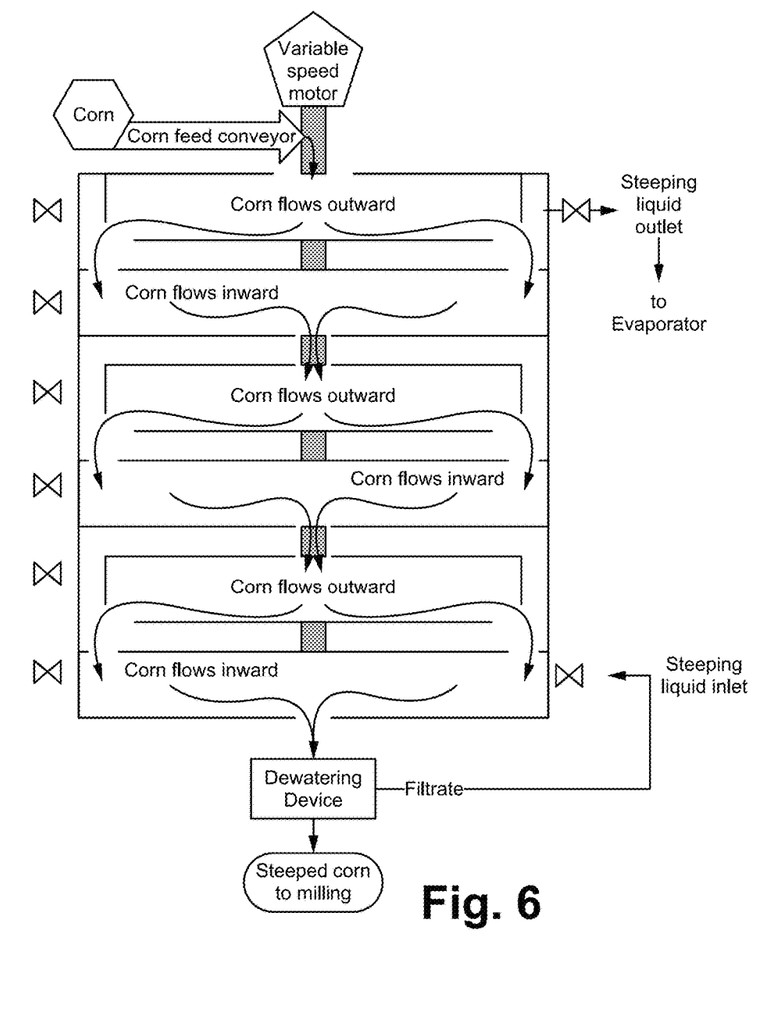
FIG. 6 illustrates a continuous steeping tank design in accordance with some embodiments.

The continuous steeping tank design shown in FIG. 6 and a four-section high-rate displacement washing paddle screen shown in the Drawing 1100 of FIG. 8 are provided in accordance with some embodiments.

DETAILED DESCRIPTION OF THE PREFERRED EMBODIMENTS

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

A Yellow Dent Corn Kernel is illustrated in FIG. 7 and its composition is illustrated in Table 1. There are 34.4 lbs. of starch per bushel of corn. Most starch is contained in two types of endosperm: floury endosperm and horny endosperm. The starch inside the floury endosperm is loosely packed inside the endosperm and quite easy to be separated out. It can be used to produce pure starch as feedstock for green technology processes. The starch in horny endosperm is contained in cells filled with granular starch in a protein matrix. It is not easy to separate out and produce starch with the bound protein.

The typical wet mill process is steeping corn in 5 to 7 batch steeping tanks for 40 to 60 hours, then it is followed by two or three milling steps to separate/produce germ and 23° Baumé pure starch slurry with 75 to 95% starch yield inside the corn and to produce byproducts of gluten feed (fiber feed) and gluten meal (high protein feed). The typical dry mill process converts all starch inside corn to alcohol, recovering as much corn oil inside corn as possible, and producing high value byproducts as animal feed. The alcohol yield is 2.8 to 2.9 gal/Bu., 0.4 to 0.9 lb./Bu oil yield, and about 14 lb./Bu DDGS yield containing around 5% bound starch inside. About 98% starch inside the corn is converted to alcohol in a typical dry mill process.

In some embodiments, a process combining wet mill and dry mill processes with a use of a novel grinding milling device and a high-rate displacement washing paddle screen, which takes out about 60 to 80% starch inside corn to produce 23° Baumé pure starch slurry with 0.35% to 0.5% protein. The process also recovers maximum oil yield up to 1.4 lb./Bu and produces high value high protein animal feed.

In some embodiments, the process provides an optimized process/system to take the right amount of "free" starch (in most pure form from floury endosperm) and combines all of the rest of the corn compounds (pericarp, tip cap, fine fiber, corn protein, germ and grit) as feedstock for a most optimized dry mill process/system, which produces a maximum alcohol yield and the most valuable by-products including corn oil for human consumption in the front-end process (e.g., before fermentation), corn oil for biodiesel in the back-end process (e.g., after fermentation), animal feed for cows, chicken, pigs, fish, and household pets, etc.

In some embodiments, the process separates about 60 to 85% starch inside the corn, (e.g., 20 to 29 lb./Bu "free" starch from the floury endosperm) using a simple low cost improved wet mill process. In the process, the rest of starch in the corn is used as feedstock to produce alcohol and higher value-added byproducts by using an improved dry mill process.

In some embodiments, corn kernels are steeped in a continuous stepping tank for 2 to 40 hours (depending on the quality and quantity of pure starch that is needed for a green technology process). Next, the grit and germ particles are grounded in a predetermined grinding mill to less than 50-micron size to release starch and oil, which is followed by using a high-rate displacement washing paddle screen to separate/wash fiber (pericarp, tip cap, and fine fiber inside grit and germ) to produce a high value protein meal (including corn protein, germ protein and yeast protein) with 60% protein for chicken, aqua and household pets.

The corn kernels are soaked/steeped to have about 50% moisture in the steeped corn kernels, which are soften and easy to be broken in a grinding mill at Step 34 (FIGS. 3-5) as compared with dry milling the dry corn in a hammer mill using a typical dry mill process. Only 40% of energy is used in a milling Step of this Disclosure in accordance with some embodiments as compared to the energy used in a typical dry mill process.

In some embodiments, the process provides a most effective way to separate "free" starch from the floury endosperm first and then use the rest of the corn as feedstock for producing alcohol and high value by-products using an improved dry mill process.

The Process 20 of FIG. 2 illustrates an improved wet milling process with alcohol production in accordance with some embodiments.

At Step 11, five to seven batch steeping tanks are used. The steeping liquid can come from the overflow of a Clarifier nozzle centrifuge at Step 23. The corn is steeped in approximately 200 PPM sulfur dioxide solution for 50 to 60 hours to soften the corn kernels. The steeped corn fully absorbs water to about 50% DS. Excess steeped liquid is sent to an evaporator at Step 15 to produce syrup with all soluble solid inside corn.

Still referring to Step 11, the dewater steeped corn kernels are fed to a grinding mill at Step 12A to tear open the whole corn kernel to form an about 12° Baumé starch slurry with germ, grit and fiber solid inside. At Step 12A, this mixed slurry is fed to a dual germ separation cyclone (at the germ separation) at Step 13.

At Step 13, the germ particles are lighter than grits and fibers so the germs float to the top, which come as a first germ cycle overflow, which is then followed by a dewater/washing Step (not shown in figure) to remove starch to produce dry germs for oil extraction, which can produce corn oil for human consumption (not shown in figure).

Still referring to Step 13, the 12° Baumé starch slurry with grit and fiber particles comes out as underflow from a second stage germ cyclone. The underflow is then fed to a four section with high rate displacement washing design paddle screen at Step 21 (the paddle screen device is shown in the Drawing 1100 of FIG. 8). The screen sizes in these four sections vary depending on the process requirements. For example, in some embodiments, the screen size of the $1^{st}$ section screen is 50 microns, which can also be between 35 to 200 microns, and the $2^{nd}$, $3^{rd}$, and $4^{th}$ section screen can be 300 microns or in a range from 200 to 1000 microns.

At Step 21, the 12° Baumé starch slurry coming as filtrate from the first section screen is sent to a 12-stage 10 mm starch counter current washing cyclone net system in Step 22 to wash and remove insoluble and soluble protein and soluble solid (ash) inside the corn and to produce 23° Baumé pure starch slurry for next green technology processes. The fresh water is used as washing water, which is mixed with a starch slurry from the $11^{th}$ stage 10 mm cyclone net underflow as a feed for the $12^{th}$ stage cyclone net (not show). This 12-stage counter current washing at Step 22 is used to do a counter current washing by starch slurry move down forward from the $1^{st}$ stage to the $12^{th}$ stage, and washing water move up forward from the $12^{th}$ stage to the $1^{st}$ stage. The fresh water carries all the protein and soluble solid with a small amount of starch, which comes out as $1^{st}$ stage 10 mm cyclone overflow. This overflow is fed to clarifier nozzle centrifuge at Step 23 to remove all insoluble solid (protein and starch), which becomes an underflow and produces clean overflow with only soluble solid as steeping liquid to soaking/steeping corn in Step 11. The underflow from the clarifier at Step 23 with a small amount of starch in the clarifier is mixed with filtrate (having germ and grit particles) from the $2^{nd}$, $3^{rd}$, and $4^{th}$ section paddle screen in Step 21, which are fed to liquefaction and saccharification at Step 17 to liquefy starch. From Step 17, the content is sent to a fermenter at Step 18 and a distillation at Step 19 to produce and recover alcohol.

At Step 21, the overflow from corn protein dewatering at Step 24 is used as a backset stream, which is used as washing liquid to separate middle size germ/grit particle from larger size fiber (pericarp and tip cap) in the starch/germ/grit/fiber separation at Step 21. The larger fiber stays on screen and comes out as wet cake from a solid phase outlet at the end of the paddle screen at Step 21, which is followed by a fiber dewater at Step 28. At Step 29, the fiber from Step 28 is then mixed with syrup from the evaporator at Step 15, which is sent to a DDGS dryer at Step 29 to produce DDGS animal feed for cattle.

At Step 19, the whole stillage from the distillation at Step 19 is sent to liquid solid separation at Step 26. At Step 26, three or four section paddle screens with screen size of 50 micron (alternatively, screen sizes from 35 microns to 100 micron can be used) are used to separate fine protein from fine fiber and germ/grit particles.

At Step 26, the filtrate with fine protein is sent to a protein dewatering at Step 24 to produce protein cake (mainly corn protein), which is followed by using a protein dryer at Step 25 to produce gluten meal with 60% protein as chicken feed. At Step 24, the overflow from protein dewaters at Step 24 as back set stream is used as a washing liquid in both fiber separation/washing at Steps 21 and 27. The germ and grit particles that are larger than screen size stay on the screen and discharge as wet cake from a solid outlet at the end of the paddle screen.

On the other hand, at Step 26, the wet cake containing fine fiber, germ and grit particles is sent to fine milling at Step 12B to break into the smallest particles possible so as to release starch and oil. After Step 12B, the process is followed by fine fiber separation and washing paddle screen at Step 27 to separate fine fiber from fine corn and germ protein by size difference. The fine fiber is discharged as wet cake from a solid phase discharge outlet and is combined with coarse fiber (pericarp and tip cap) from Step 21. The mixture from Step 27 and Step 21 are sent to a fiber dewatering at Step 28 and DDGS dryer at Step 29 to produce DDGS as cow feed. At Step 27, the middle size germ and grit particle with washing liquid come out as filtrate from the $2^{nd}$, $3^{rd}$ and $4^{th}$ sections of the screen paddle screen at Step 27 is recycled back to the whole stillage feed tank to fine grind mill at Step 12B one more time.

The process 20A of FIG. 2A further uses a fine germ milling device (e.g., Supraton) at Step 12C to break up germ particles so as to release oil and recover corn oil at the de-oil process at Step 20.

The Process 30 of FIG. 3 illustrates an improved dry milling process with pure starch production in accordance with some embodiments. FIG. 6 illustrates a corn steeping process in a continuous steeping tank in accordance with some embodiments. FIG. 3 and FIG. 6 can be jointly read together. The continuous steeping tank has a large tank with a height close to the size of its diameter. This continuous steeping tank is divided into about 10 to 16 chambers. Each chamber has a paddle attached to a center shaft which rotates at a very slow speed (2 to 20 rpm) using a variable speed motor. In some embodiments, the paddle includes two designs. One of the designs is illustrated in 6A, which is a paddle design for moving corn kernels inward in the chamber. Another design is illustrated in 6B, which is a paddle design for moving corn kernels outward in the chamber.

Figure 6A:
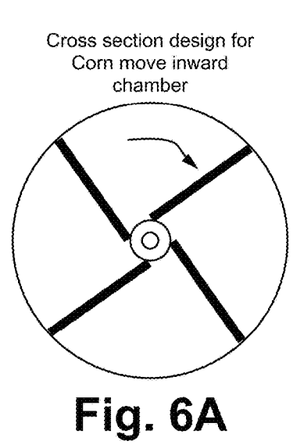
FIG. 6A illustrates a cross sectional design for corn moving inward in the chamber in accordance with some embodiments.
Figure 6B:
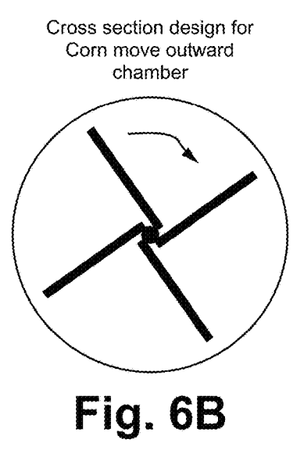
FIG. 6B illustrates a cross sectional design for corn moving outward in the chamber in accordance with some embodiments.

The first chamber on the top starts with a paddle design using 6A moving corn kernels outward, and the design of 6B is followed to be used in the next chamber moving corn kernels inward in the chamber. The two paddle designs are used continuously in an alternative arrangement from the top of the tank to the bottom of the tank. The very bottom chamber will use a paddle design moving corn kernels inward using design 6B (e.g., from the top chamber to the bottom chamber can use a pattern of design having 6A for the $1^{st}$ chamber, 6B for the $2^{nd}$ chamber, 6A for the $3^{rd}$ chamber, 6B for the $4^{th}$ chamber, 6A for the $5^{th}$ chamber, and 6B for the $6^{th}$ chamber or the bottom chamber), so that the corn kernels can be continuously fed to the continuous steeping tank by using a conveyor on top of the continuous steeping tank and coming out uniformly (all corn kernels have same steeping time, which goes from the bottom of the continuous steeping tank to a dewater device before the corn kernels are fed to a grind mill at Step 34). The steeping liquid from overflow of Clarifier at Step 23 is sent to the bottom of the continuous steeping tank at Step 11 and comes out from the top of the continuous steeping tank. This steeped liquid is sent to the evaporator at Step 15 to remove water and form syrup. A portion of the steeped liquid is sent to a heat exchanger to maintain a temperature just below a starch gelatin point (around 115F) and recycle the steeped liquid to bring incoming corn to optimum steeping temperature (around 110F to 115F).

The corn kernels move from a storage bin through a conveyor system. They are continuously fed to the top of the continuous steeping tank, and move uniformly downward through each chamber by the movements of the paddle driven by a variable speed motor on the top. The steeping time (ranging from 2 to 40 hours) is adjusted by using the variable speed motor. A shorter steeping time gives a lower purity of the starch and a lower alcohol yield, whereas a longer steeping time gives a higher purity of the starch and a higher alcohol yield. The soluble solids (optimum amount is 3 to 4% by weight of ash content) in the steeped liquid are coming from top of the continuous steeping tank to the evaporator Step 15. The steeped corn kernels from the bottom of the continuous steeping tank maintain a moisture level at 45 to 50%. The steeping time is set to between 2 to 40 hours. A longer steeping time gives a higher moisture content in the steeped corn kernels and gives a better yield and purer starch as feedstock for use in green technology processes.

Next, the steeping liquid is sent to an evaporator Step 15 to pre-concentrate the liquid to about 50% DS, and then the liquid is fed to De-oil at Step 33 (e.g., using a three-phase decanter) to recover oil and remove any fine solid. Next, a vacuum evaporator is used to further concentrate the liquid to form a maximum concentration (85% DS) syrup, which can bypass/skip dryer at Step 29 and produce a high nutrient enrich probiotic DDGS.

The overflow from the clarifier at Step 23 is used as steeping liquid, which is fed to the bottom of the continuous steeping tank. The amount of the steeping liquid should be enough to keep the percentage of the soluble solid (ash content) at the steeped liquid outlet below the maximum percentage of the soluble solids (around 5.6% of ash content). The steeped liquid coming from the top of the continuous steeping tank is sent to an evaporator at Step 15. The evaporator's feeding tank has a waste heat recovery system, which takes waste heat that are condensed from the evaporator to heat the incoming corn kernels and maintain an optimum steeping temperature (e.g., 100 to 115F) by recycling the steeping liquid between the feed tank and the top chamber of the steeping tank.

The steeped corn kernels, from the bottom of the continuous steeping tank after dewatering having about 50 to 60% DS, are sent to a grind mill at Step 34 with solid ring design to release "free" starch from endosperm and to grind germs and grits to around 200 to 400 microns. The grinded corn slurry from grind mill at Step 34 is fed to a four-section high-rate washing paddle screen at Step 21 using a screen size of 50 microns (alternatively, 35 to 75 microns) in first section screen, 300 micron (alternatively, 200 microns to 1 mm) at the $2^{nd}$, $3^{rd}$ and $4^{th}$ section of the screens. The filtrate from first section contains mainly "free" starch (about 12° Baumé starch slurry) with some proteins are sent to pre-concentrating at Step 36 to be concentrated to 23° Baumé before sending the content to a starch washing 10 mm cyclone net system at Step 22. The overflow from pre-concentrate or recycle back is mixed with a grinded corn to form slurry to starch/germ/grit/fiber separation paddle screen at Step 21. The wet cake from starch/germ/grit/fiber separation at Step 21 and underflow from clarifier nozzle centrifuge at Step 23 are mixed with the $1^{st}$ filtrate from the fiber washing at the Step 32, which are sent to a slurry tank at Step 31 to liquefy the starch then followed by using a fiber washing paddle screen at Step 32 to separate/wash fiber and discharge as wet cake. The back stream (e.g., backset) is used as washing liquid. At Step 32, the first filtrate from the first section screen containing liquefied starch is sent to a fermentation at Step 18 to produce alcohol and recover alcohol in the distillation at Step 19.

At Step 19, the whole stillage from the distiller's bottom is sent to a solid/liquid separation paddle screen at Step 26. At Step 26, the filtrate containing proteins is sent to a protein dewater at Step 24 to produce a protein wet cake. At Step 24, the process is followed by using a protein dryer at Step 25 to produce a high value protein product with 60% of proteins. Still referring to Step 26, the wet cake from liquid/solid separation paddle screen at Step 26 that contains germ and grit particles is sent to a fine grind mill at Step 35 to break up the particles and to release starch and oil. The broken germ and grit particles are sent to a fine fiber separation and washing paddle screen at Step 27. The backset is used as washing liquid, and fine fiber wet cake is sent to a fiber dewatering at Step 28, which is followed by using a DDGS dryer at Step 29 to produce DDGS as cow feed. The middle size germ and grit particles can be optionally recycled back and put through a fine grind mill at Step 35 one more time to break the particles further. When a whole stillage decanter is used on the protein dewatering at Step 24, the low-G decanter only recovers corn protein and some germ protein. Thus, a high-speed nozzle centrifuge is used to recover yeast proteins.

The Process 40 of FIG. 4 illustrates a combination of a wet mill process and a dry mill for producing high value byproducts in accordance with some embodiments.

The oil/protein separation at Step 41, and yeast/germ protein dewatering at Step 42, and a yeast/germ protein dryer at Step 43 are added to the above Process 30 of FIG. 3 to form this Process 40 of FIG. 4. Similar process steps that are described above are not repeated for succinctness. The overflow from the corn dewatering at Step 24 contains yeast and germ protein with corn oil inside, which is sent to a high speed three phase nozzle centrifuge (that has over 5000G force) to break the oil/protein emulsion. The corn oil with some emulsion and liquid comes out as a light phase and the clean thin stillage comes out as a heavy phase. The underflow from a nozzle discharge contains mainly yeast and germ proteins with about 10 to 30% of spin solid volume. The corn oil stream as a light phase is sent to a continuous steeping tank for recovering oil in the de-oil at Step 33. The thin stillage discharge as a heavy phase is discharged from the oil/protein separation at Step 41, which is used as a backset washing water to wash fiber in both fiber separation and washing at Steps 27 and 32. The combined fiber (pericarp tip cap and fine fiber) is sent to a fiber dewater device at Step 28, which is then mixed with the de-oil syrup and is dried in a DDGS dryer at Step 29 to produce DDGS as cow feed.

At Step 41, the underflow contains yeast/germ protein with about 30% spin solid volume from oil/protein separation at Step 41 is sent to yeast/germ protein dewatering at Step 42. A high-speed decanter is normally used in yeast/germ protein dewatering at Step 42.

Still at Step 42, the wet cake with about 25% DS protein cake comes from the protein dewatering. This high moisture wet cake should use a high-cost ring dryer to dry and produce high value yeast/germ protein meal with 60% protein as household pet and aqua feed. Mixing two parts of dry corn proteins from the corn protein dryer at Step 25 with one-part wet cake from the yeast/germ protein dewatering at Step 42 to form a semi dried cake with about 50% DS. This semi dry Cake with about 50% DS can be dried in a typical rotary dryer avoiding excessive cost ring dryer and produce acceptable high value yeast/germ/corn protein feed.

The Process 50 of FIG. 5 illustrates a combined wet mill process and a dry mill process for producing maximum value byproducts in accordance with some embodiments.

The steeping and dewater at Step 11 are further improved by adding lactic acid producing probiotic cultures, such as *Lactobacillus plantarum* ZJ316, Lactobacillus amylovorus, Lactobacillus Fermentum, and Lactobacillus mucosae to Step 11. Those cultures convert the sugar to lactic acid with up to 20% lactic acid in DB and have 10^9 CSU probiotic units in De-oil syrup after De-oiling at Step 33. This enriched probiotic syrup can be part of animal drinking water formula or baby animal milk formula. This enriched probiotic syrup also can be used as a bonding agent in animal pellet/tub formation as shown in the Process 50 of FIG. 5. The pellet/tub formation at steps 51 and 52 for producing enriched probiotic high protein meal (corn protein, yeast protein, and germ protein) are provided herein.

Although corn kernels are disclosed as an example, the process and equipment described herein can also be used for other types of grains such as rice, wheat and sorghum. So other grains are also included within the scope of the Present Disclosure.

In utilization, the process disclosed herein can be used to produce pure starch having a quality fit for as a feedstock for a new green technology process.

What is claimed is:

1. A wet mill process for producing a purified starch slurry comprising:
    steeping corn kernels;
    grinding the corn kernels to generate corn components comprising starch only from floury endosperm of the corn kernels, germ, grits and fiber, wherein the starch is >10% by weight of the corn components;
    performing germ separation to separate the germ from a first portion of the corn components having the starch, the grits and the fiber; and
    separating the starch from the first portion to generate a starch portion having a purity with less than 5% by weight of protein using a device selected from a three or more sectional paddle screen and a second portion of the corn components, wherein the second portion has a fiber >30% by weight of the second portion.

2. The wet mill process of claim 1, wherein the starch portion is a filtrate from the three or more sectional paddle screen.

3. The wet mill process of claim 2, wherein the three or more sectional paddle screen uses a particle separator having a 50-micron screen to separate the starch from the grits and the fiber.

4. The wet mill process of claim 3, wherein the starch separated is about 60%-85% by weight of the starch inside the corn kernel before the grinding.

5. The wet mill process of claim 1, further comprising performing a 12-stage starch washing to produce a 23° Baumé pure starch slurry with less than 0.5% by weight of protein.

6. The wet mill process of claim 5, further comprising sending the washing liquid with protein, and other soluble solids to a Clarifier nozzle centrifuge.

7. The wet mill process of claim 6, further comprising combining an underflow portion from the Clarifier nozzle centrifuge with the second portion of the corn components to be further liquified and saccharified.

8. The wet mill process of claim 7, further comprising fermenting.

9. The wet mill process of claim 8, further comprising distilling for making alcohol.

10. The wet mill process of claim 9, further comprising sending whole stillage after the distillation to a liquid and solid separation using a second three or more sectional paddle screen to separate protein from remaining fiber and/or germ/grit particles.

11. The wet mill process of claim 10, further comprising performing fine grind milling.

12. The wet mill process of claim 1, further comprising performing germ fine milling using Supraton (a rotor-stator homogenizer) to break up germ particles so that corn oil is released.

13. The wet mill process of claim 12, further comprising recovering corn oil.

14. The wet mill process of claim 1, further comprising evaporating a steeping liquid after the steeping corn kernels.

15. The wet mill process of claim 14, further comprising sending evaporated substance to a dryer.

16. The wet mill process of claim 14, further comprising forming a dried distiller grains (DDGS) as cow feed.

* * * * *